(12) United States Patent
Todd et al.

(10) Patent No.: US 8,478,936 B1
(45) Date of Patent: Jul. 2, 2013

(54) SPIN DOWN OF STORAGE RESOURCES IN AN OBJECT ADDRESSABLE STORAGE SYSTEM

(75) Inventors: Stephen J. Todd, Shrewsbury, MA (US); Mark O'Connell, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 462 days.

(21) Appl. No.: 12/649,113

(22) Filed: Dec. 29, 2009

(51) Int. Cl.
*G06F 12/02* (2006.01)
(52) U.S. Cl.
USPC .................................. 711/114; 711/E12.001
(58) Field of Classification Search
None
See application file for complete search history.

(56) References Cited

U.S. PATENT DOCUMENTS

| | | | | |
|---|---|---|---|---|
| 5,961,613 A | * | 10/1999 | DeNicola | 710/18 |
| 7,904,557 B1 | * | 3/2011 | Van Riel et al. | 709/225 |
| 2008/0065718 A1 | * | 3/2008 | Todd et al. | 709/203 |
| 2010/0070706 A1 | * | 3/2010 | Inomata | 711/114 |

* cited by examiner

*Primary Examiner* — Edward Dudek, Jr.
*Assistant Examiner* — Ryan Dare
(74) *Attorney, Agent, or Firm* — Krishnendu Gupta; Robert Kevin Perkins; Joseph D'Angelo

(57) ABSTRACT

Aspects of the invention relate to spin down of storage devices on an object addressable storage (OAS) system. One or more of the storage devices in object addressable storage system may be spun down to achieve a power savings, while other storage devices in the OAS system remain in an active state.

18 Claims, 10 Drawing Sheets

SPIN DOWN OF STORAGE RESOURCES IN AN OBJECT ADDRESSABLE STORAGE SYSTEM

FIELD OF INVENTION

The present application relates to computer systems employing object addressable storage.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier, and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of a type of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY

One embodiment is directed to an object addressable storage (OAS) system comprising: a plurality of storage devices, each of which stores a plurality of content units; at least one input/output (I/O) interface configured to receive access requests to access the OAS system, wherein an access requests to access a content unit stored on one of the plurality of storage devices identifies the requested content unit using an object identifier that, from the perspective of an entity issuing the access request, does not indicate any physical or logical storage location of the requested content unit on the OAS system; and at least one controller, coupled to at least some of the plurality of storage devices and the at least one I/O interface, configured to: during operation of the OAS system, selectively spin down at least one of the plurality of storage devices, wherein after spinning down the at least one of the plurality of storage devices, at least one other of the plurality of storage devices remains active and the at least one controller remains available to process access requests received via the at least one I/O interface.

Another embodiment is directed to a computer in a computer system comprising the computer and a federation of storage systems, wherein the federation of storage systems comprises a first object addressable storage (OAS) system and a second OAS system, and wherein the computer comprises: at least one tangible memory; at least one input/output (I/O) interface configured to receive access requests to access the federation and to send access requests to the first OAS system and second OAS system; and at least one controller, coupled to the at least one tangible memory and the at least one I/O interface, configured to: receive a first access request from a host computer to access a content unit stored in the federation, wherein the first access request identifies the requested content unit using an object identifier that, from the perspective of the host computer, does not indicate any physical or logical storage location of the requested content unit in the federation, and wherein the object identifier includes a timestamp that indicates a time at which the requested content unit was stored in the federation; in response to the receiving the first access request, determine which OAS system in the federation stores the requested content unit based, at least in part, on the timestamp in the object identifier; determine whether the OAS system in the federation that stores the requested content unit is in a spun down state; after it is determined that the OAS system in the federation that stores the requested content unit is in a spun down state, cause the OAS system in the federation that stores the requested content unit to be spun up; and send a second access request to the OAS system in the federation that stores the requested content unit to access the requested content unit, wherein the second access request identifies the requested content unit using its object identifier.

A further embodiment is directed to a method of operating an object addressable storage (OAS) system that comprises a plurality of storage devices, each of which stores a plurality of content units and at least one input/output (I/O) interface configured to receive access requests to access the OAS system, wherein an access requests to access a content unit stored on one of the plurality of storage devices identifies the requested content unit using an object identifier that, from the perspective of an entity issuing the access request, does not indicate any physical or logical storage location of the requested content unit on the OAS system, the method comprising: during operation of the OAS system, selectively spinning down at least one of the plurality of storage devices, wherein after spinning down the at least one of the plurality of storage devices, at least one other of the plurality of storage devices remains active and the at least one controller remains available to process access requests received via the at least one I/O interface.

DETAILED DESCRIPTION

I. Overview of OAS Storage

Figure 1:
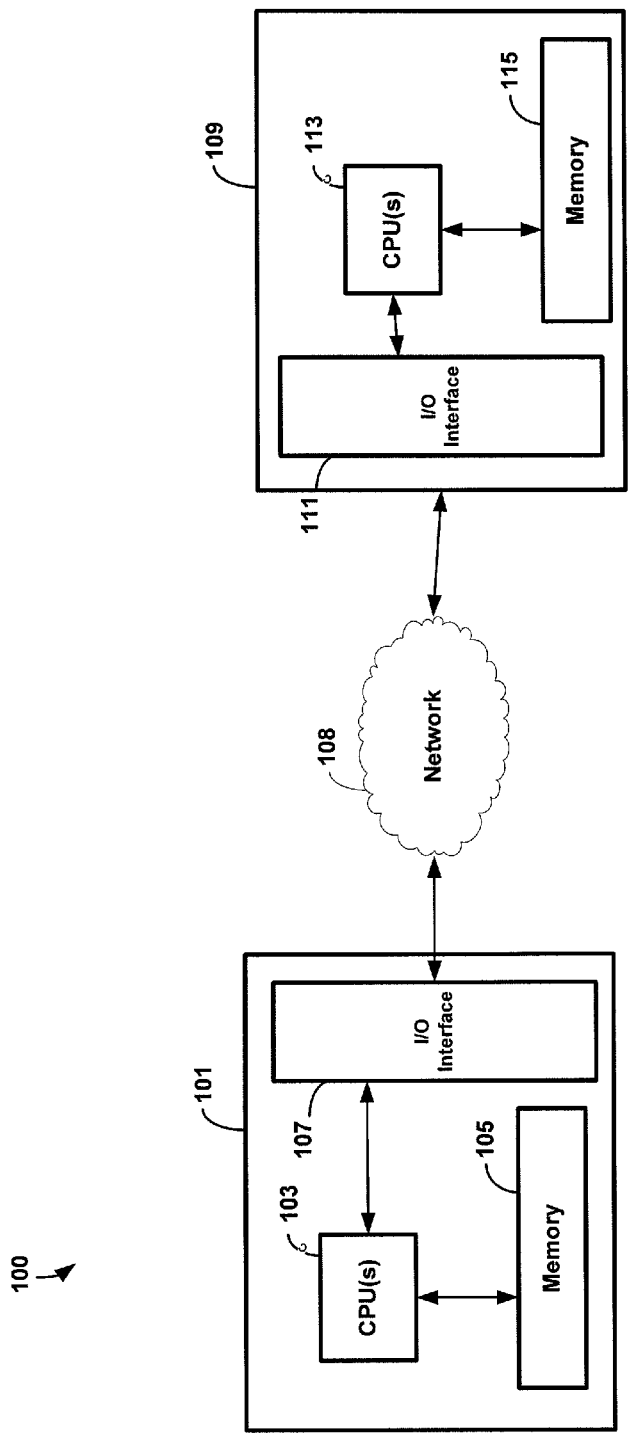
FIG. 1 is a block diagram of a computer system in which some embodiments of the invention may be implemented.

FIG. 1 shows an illustrative computer system 100 in which some embodiments of the invention may be implemented. As shown in FIG. 1, computer system 100 includes a host computer 101 and an OAS system 109. Host computer 101 includes one or more hardware processors 103 coupled to at least one tangible storage memory 105 and at least one input/output (I/O) interface 107. CPU(s) 103 may execute one or more application programs that send OAS access requests via I/O interface 107 to store data on or retrieve data from OAS system 109. Such access requests may be sent over a network 108.

OAS system 109 comprises one or more hardware processors 113 coupled to a hardware memory 115, and an I/O interface 111. Memory 115 may include one or more storage devices (e.g., disk drives or other types of storage devices). OAS system 109 may receive (via network 108 and I/O interface 111) and process OAS access requests from host computer 101 and may return responses to those access requests to host computer 101.

In the example of FIG. 1, the application program(s) that generate access requests to be sent to OAS system 109 execute(s) on host computer 101 that is separate from OAS system 109. However, this is but one example of a system on which such application programs may execute, as such application programs may execute on any suitable system. For example, in some embodiments, such application programs may execute on OAS system 109 itself. In such embodiments, the access requests need not be sent over network 108, but rather may be processed internally in OAS system 109.

A. Distributed OAS Architecture

Figure 2:
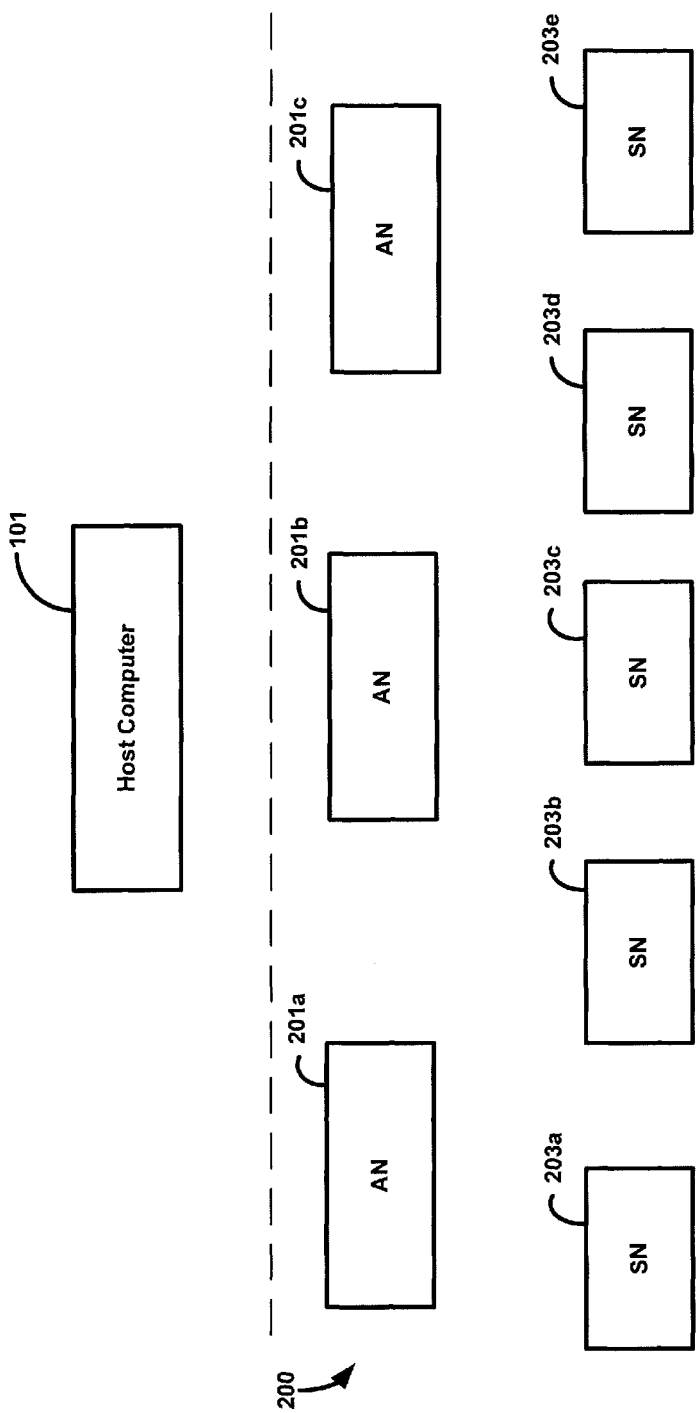
FIG. 2 is a block diagram of a distributed object addressable storage (OAS) system, on which some embodiments of the invention may be implemented.

In some embodiments, OAS system 109 may be a distributed storage system. FIG. 2 shows an example of a distributed storage system 200 that may be used, in some embodiments, to implement OAS system 109. Distributed storage system 200 includes a plurality access nodes 201a-201c and a plurality of storage nodes 203a-203e. Access nodes 201 may receive and respond to access requests from a host computer 101, and storage nodes 203 may store data sent to storage environment 200 by host computer 101. Access nodes 201 and storage nodes 203 may be coupled by a network (not shown) and communicate over the network such that each node may make its presence on the network known to the other nodes. In this manner, the nodes may operate together to process access requests and store data for host computer 101.

Each node may include processing resources (e.g., processor and memory) and storage devices. The nodes communicate with each other to store data, respond to access requests, and perform other functions. To a user of the storage system (e.g., the host computer 101 or an application program executing thereon), the storage environment may appear as a single entity. That is, the user need not be aware that the storage environment includes a plurality of separate nodes or on which storage node a certain unit of data is stored or mirrored.

To increase the storage capacity of the storage system 200, more storage nodes may be added and coupled to the network. These additional storage nodes may make their presence known on the network, thus allowing access nodes 201 to employ the additional storage in the storing of data. Adding more storage nodes to the storage network without increasing the number of access nodes may result in the access nodes acting as a bottleneck for the storage environment and a degradation in performance. Thus, it may desirable when increasing the number of storage nodes to also increase the number of access nodes.

Storage system 200 may perform a number of functions, such as determining on which storage node 203 to store data in response to a write request from host 101, determining on which storage node 203 data is stored in response to a read request from host 101, performing garbage collection of data that may be deleted from the storage environment, enforcing retention periods that specify a period of time that data should not be deleted from the storage environment, mirroring data (i.e., creating one or more mirror copies on different nodes of the storage environment), self-healing to compensate for failure of one or more nodes, and other functions.

B. File System(s) in an OAS System

In some embodiments, OAS system 109 may employ one or more file systems to manage storage of objects on one or more storage devices. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an Mode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an mode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

Figure 3:
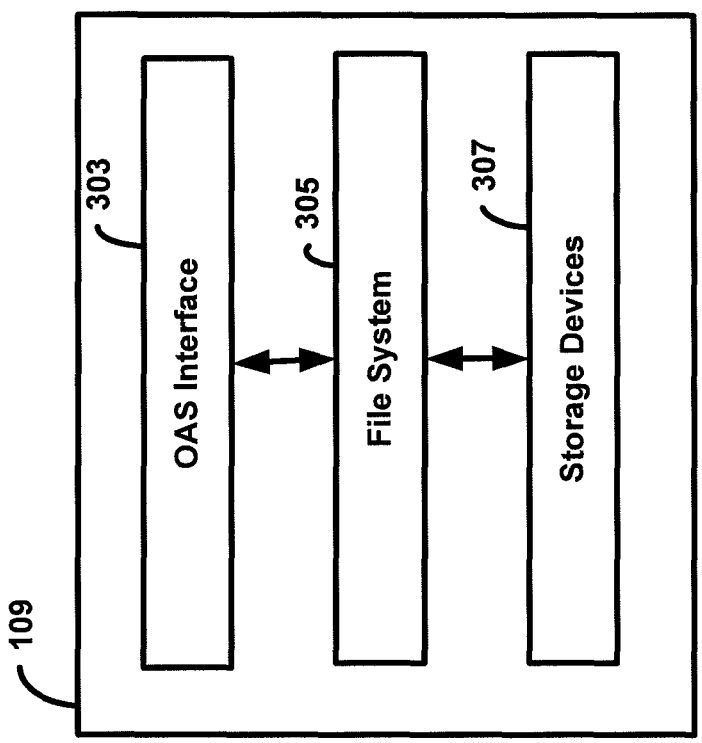
FIG. 3 is a block diagram of an OAS system that uses a file system to organize content units stored thereon.

As mentioned above, some OAS systems may store content in a file system. FIG. 3 shows an example of such an OAS system 109 that includes an OAS interface 303 (which may be included in I/O interface 111), a file system 305, and one or more storage devices 307 (which may included in memory 115). When OAS Interface 303 receives a request (e.g., from an application program) to store a content unit, the OAS Interface may assign an object identifier to the content unit (which may be generated either by the OAS system, the entity that issued the request, or some other entity), and may issue a request to file system 305 to store the content unit in one or more files. The file system may store the content unit on physical storage device(s) 307, and may store metadata associating the file(s) in which the content of the content unit is stored with the physical location(s) of the content on the physical storage device(s).

When a request to access the content unit (that identifies the content unit using its object identifier) is subsequently received by OAS Interface 303, the OAS Interface determines the file or files in file system 305 that logically store the content of the content unit.

Once the OAS Interface determines the file(s) in file system 305 that store(s) the content of the content unit, the OAS Interface may send a request to the file system to access the file(s). In response, the file system may determine the physical storage location(s) of the content unit on the physical storage device(s), and request the content stored and the determined physical storage location(s) from the physical storage device. Upon receiving the requested content, the file system may return the content to the OAS Interface, which may return it to the requesting entity.

The simplified block diagram of OAS system 109 shows file system 305 directly accessing storage device(s) 307. However, this is provided merely as a simplified example, as file system 305 may access the storage device(s) in any suitable way. For example, in some embodiments file system 305 may access the storage device(s) via a device driver that provides an interface to the storage device(s) or via an operating system that interfaces with the device driver for the storage device(s).

Figure 4:
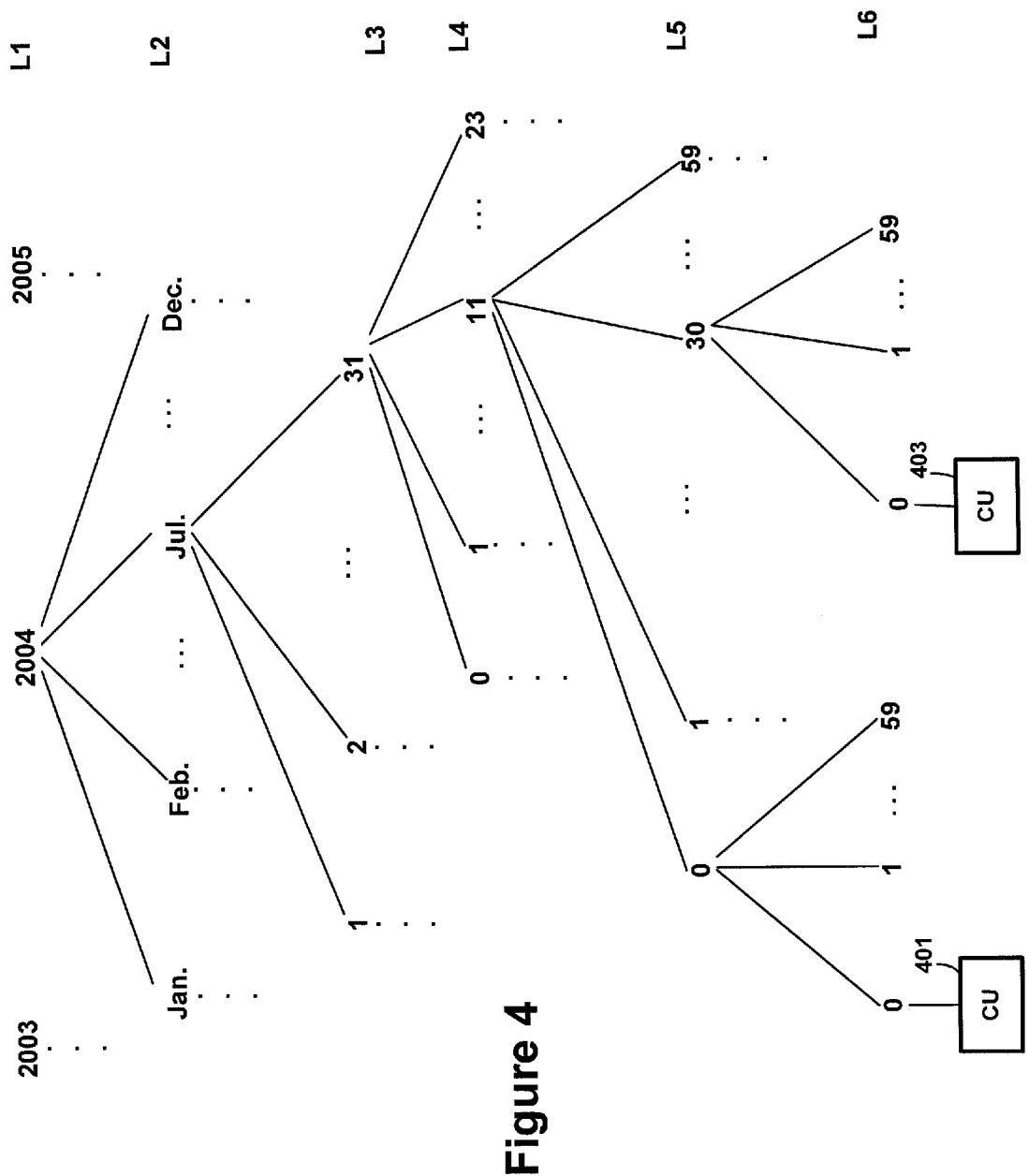
FIG. 4 is a diagram of time based directory structure that may be used, in some embodiments, by the file system of FIG. 3.

In some embodiments, file system 305 may employ a time-based directory structure for logically storing content units therein. In a time-based directory structure, content units may be stored as files in the file system and the file system location at which a content unit (e.g., a file) is stored may be selected based on the time at which the content unit was stored by the source (e.g., an application program). The directory structure is organized such that each directory corresponds to a period of time, and each subdirectory in a directory corresponds to a period of time that is subsumed by the period of time corresponding to its parent directory. FIG. 4 shows an example of a time-based directory structure having six levels. For the sake of brevity, the entire directory structure is not expanded, but may be understood to be complete from the example subdirectories of the directory "2004" at L1.

In the example of FIG. 4, a content unit 401 that is stored on Jul. 31, 2004 at 11:00 AM may be stored in the directory structure, wherein a directory at L1 designates the year in which the content unit was stored, the subdirectory at L2 designates the month, the subdirectory at L3 designates the day, the subdirectory at L4 designates the hour, the subdirectory at L5 designates the minute, and the subdirectory at L6 designates the second. Content units may be stored in the bottom level or "leaf" directory (e.g., the directory at L6). Thus, for example, the content unit stored on Jul. 31, 2004, at 11:00 AM may be stored in the L6 directory having a path of /2004/07/31/11/00/00, wherein "2004" is the L1 directory corresponding to the year 2004, "07" is a subdirectory of the 2004 directory corresponding to the month of July 2004, the subdirectory "31" of the "07" directory is the L3 directory corresponding to the $31^{st}$ day of July, 2004, the subdirectory "11" of the "31" directory is the L4 directory corresponding to the $12^{th}$ hour of the $31^{st}$ day of July, 2004, the subdirectory "00" of the "11" directory is the L5 directory corresponding to the $1^{st}$ minute of the $12^{th}$ hour of the $31^{st}$ day of July, 2004, and the subdirectory "00" of the "00" L5 directory is the L6 directory corresponding to the first second of the $31^{st}$ minute of the $12^{th}$ hour of the $31^{st}$ day of July, 2004. If a second content unit 403 were stored by an application program on Jul. 31, 2004 at 11:30 AM, the second content unit may be stored in the directory /2004/07/31/11/30/00.

It should be appreciated that the embodiments of the present invention described below that employ time in specifying a directory structure for storing content units are not limited to use with directory structures having the arrangement of the particular example described above, as the embodiments of the present invention can be implemented in any of numerous ways, including with directory structures using different units of time (or different granularities) as establishing boundaries for the subdirectory levels.

In the example above, the hierarchical directory structure had six levels and the smallest unit of time granularity (i.e., the lowest level in the hierarchy) corresponded to the second in which a content unit was stored. However, as mentioned above, embodiments of the invention described herein are not limited in this respect, as they can be used with directory structures having any suitable number of levels, with each level corresponding to any suitable unit of time.

II. Spin Down on an OAS System

Some embodiments relate to techniques for performing spin down on an OAS system. As used herein, spin down of a storage device is defined to mean turning off the power of a storage device or the system in which the storage device resides or placing the storage device in a low power mode, such that when the storage device is "spun down" it is incapable of processing requests to store data thereon or to retrieve or return data stored thereon. Likewise, spin up of a storage device is defined to mean restoring power to a spun down storage or the system in which the storage device resides, or taking the storage device out of low power mode such that it is in active state and can process requests to store or retrieve data. Spin down of a content unit refers to spin down of the storage device on which the content unit stored.

Spinning down storage devices is a technique for saving power. That is, when a storage device is spun down, it consumes less power than when in an active state. However, when the storage device is spun down, data stored thereon may not be accessed without spinning up the storage device. Thus, accessing data from a storage device that is spun down increases access time because the storage device must be spun up in order to retrieve data therefrom or store data thereon.

The inventors have appreciated that performing spin down on an OAS system may provide additional opportunities for power savings because, in an OAS system, the identifier that is used to identify a requested content unit in access requests for the content units is not tied to any physical or logical location at which the content unit is stored. This enables the OAS system to move a content unit to a different physical or logical location without any change in its object identifier. The inventors have appreciated that this presents opportunities to move certain content units to storage devices that are to be spun down without having to notify any requesting entities of a change in location. Because a content unit may be readily moved to a storage device that is to be spun down, additional opportunities to achieve power savings are created.

Examples of some techniques for performing spin down on an OAS system are described below.

A. Spin Down Using Virtual Pools

In some embodiments, an OAS system may be segregated into one or more virtual pools. Virtual pools are described in greater detail in U.S. Pat. No. 7,539,813, which is hereby incorporated by reference in its entirety. A virtual pool is a logical grouping of storage resources and/or content units, which may be grouped based on any suitable criterion or criteria. For example, virtual pools may be defined based on the identity of the content source (e.g., a host computer, application program, other storage system, etc.) to which the virtual pool is allocated, and/or based on common access permissions for the content units grouped together in a virtual pool. Content units may also be grouped together into a virtual pool based on the storage systems capabilities that are to be applied to the content units. For example, content units that are to be replicated synchronously may be grouped into one virtual pool, content units that are to be replicated asynchronously into another, and content units that are not to be replicated grouped into yet another. In addition, in some embodiments, content units with a common spin down policy may be grouped into a virtual pool.

In some embodiments, virtual pools may be implemented by segregating storage system resources into virtual pools. For example, one or more storage devices or nodes of the OAS system may be allocated to each virtual pool, such that each of the content units stored in a virtual pool are stored on the storage resources that are allocated to that virtual pool. In such embodiments, when a virtual pool is created on an OAS system, a mapping from the virtual pool to the storage system resources used to store the content units included therein may be created and stored.

Figure 5:
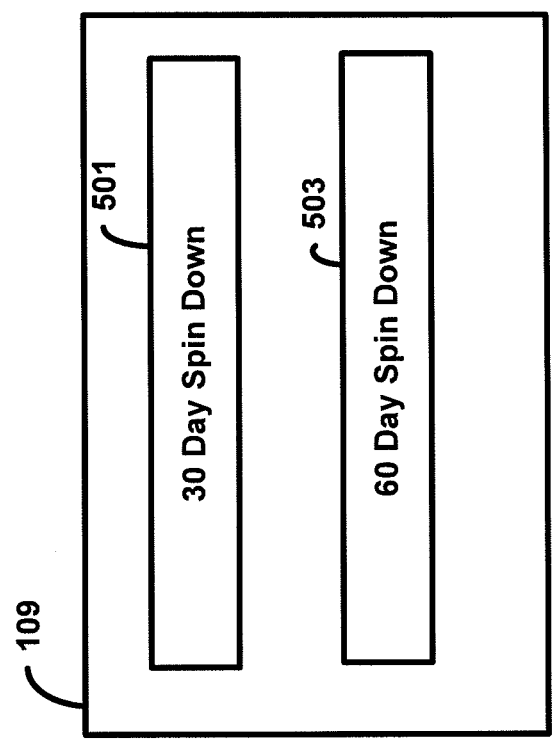
FIG. 5 is a block diagram of an OAS system having virtual pools that organize content units based on a common spin down policy, in accordance with some embodiments.

As discussed above, in some embodiments, virtual pools may be created on the OAS system based on a time at which it is desired that the content units stored therein be spun down. For example, as shown in FIG. 5, OAS system 109 may have two virtual pools. Virtual pool 501 may be created and used to store content units that are eligible to be stored on a spun down storage device thirty days after being stored on OAS system 109 and virtual pool 503 may be created and used to store content units that are eligible to be stored on a spun down storage device sixty days after being stored on OAS system 109. Each of virtual pools 501 and 503 may have a separate set of storage resources that is used to store the content units stored therein. For example, virtual pool 501 may be allocated two disk drives to store its content units, and virtual pool 503 may be allocated two different disk drives to store its content units.

As the storage capacity of a storage device in a virtual pool fills up, it may become eligible to be spun-down. For example, as discussed above, virtual pool 501 may initially have two disk drives allocated to it. When a request to store a content unit is received and OAS system 109 determines that the content unit is to be stored in virtual pool 501, the OAS system may store the content unit on a first of the disk drives allocated to virtual pool 501. The OAS system may process access requests to store content units in virtual pool 501 until the first disk drive begins to fill up. Thus, when the available storage capacity of the first disk drive falls below a threshold (e.g., five percent), then the first disk drive may become eligible to be spun down. That is, once the available storage capacity of the first disk drive falls below the threshold and thirty days has passed since the time of storage of the content unit most recently stored on the first disk drive, the first disk drive may be spun down. Once the first disk drive has been spun down, content units to be stored in virtual pool 501 may be stored on the second disk drive allocated to virtual pool 501. When the available storage capacity on the second disk drive falls below a threshold, the second disk drive may be spun down after thirty days has passed since the time of storage of the content unit most recently stored on the first disk drive. Once both disk drives of virtual pool 501 have been spun down, additional storage devices may be allocated to virtual pool 501 to store additional content units in the virtual pool.

Similarly, with respect to virtual pool 503, when the storage capacity of a disk drive allocated to virtual pool 503 falls below the threshold, the disk drive may be spun down after sixty days has passed since the time of storage of the content unit most recently stored on the first disk drive.

In the examples above, the storage resources allocated to each virtual pool are disk drives. However, a disk drive is one example of a type of storage resource that may be allocated to a virtual pool, and other types of storage devices or other storage resources may be allocated to a virtual pool. For example, in some embodiments in which OAS system 109 is a distributed storage system, one or more storage nodes may be allocated to a virtual pool, and an entire storage node may be spun down at the appropriate time.

In the examples above, each virtual pool is allocated its own set of storage resources. However, in some embodiments, storage resources may not be allocated for the exclusive use of any given virtual pool and the virtual pools in the OAS system may share storage resources. In such embodiments, when a request to store a content unit that belongs to a particular virtual pool is received, the content unit may be stored on any suitable physical storage device and metadata may be stored indicating that the content unit belongs in the appropriate virtual pool. Thus, in the example of FIG. 5 in which OAS system 109 includes virtual pools 501 and 503, when a request to store a content unit that belongs in virtual pool 501 is received, the OAS system may store the content unit in any suitable available physical storage location. As a result, the content units stored in a virtual pool 501 may be distributed across many different storage devices in the OAS system that also store content units not in virtual pool 501.

In such embodiments, when the collective storage space consumed by content units stored in a virtual pool that are eligible to be spun down becomes large enough to fill a storage device or resource (e.g., a disk drive), the content units in the virtual pool that are eligible to be spun down may be migrated from their respective storage locations to a storage device to be spun down, and once the migration is complete the storage device to which the content units have been migrated may be spun down. Thus, for example, content units that have been stored in virtual pool 501 for at least thirty days may be migrated from their respective storage locations to a storage device that may be spun down after the migration. Content units that have been stored in virtual pool 503 for at least sixty days may be migrated from their respective storage locations to a different storage device that may be spun down after the migration.

In some embodiments, the storage device to which content units are migrated may be an unused storage device that is available to store the migrated content units. In other embodiments, the storage device to which content units are migrated may, prior to migration, be in use storing content units that do not belong to the virtual pool of the content units being migrated to the storage device or storing content units that belong to that virtual pool but are not yet eligible to be spun down. In such embodiments, the content units that do not belong to the virtual pool or that belong to the virtual pool but are not eligible to be spun down may be migrated off the storage device to other storage locations in the OAS system, and the content units that belong to the virtual pool that are eligible to be spun down may be migrated from their respective storage locations to the storage device.

B. Spin Down Of Blobs

Figure 6:
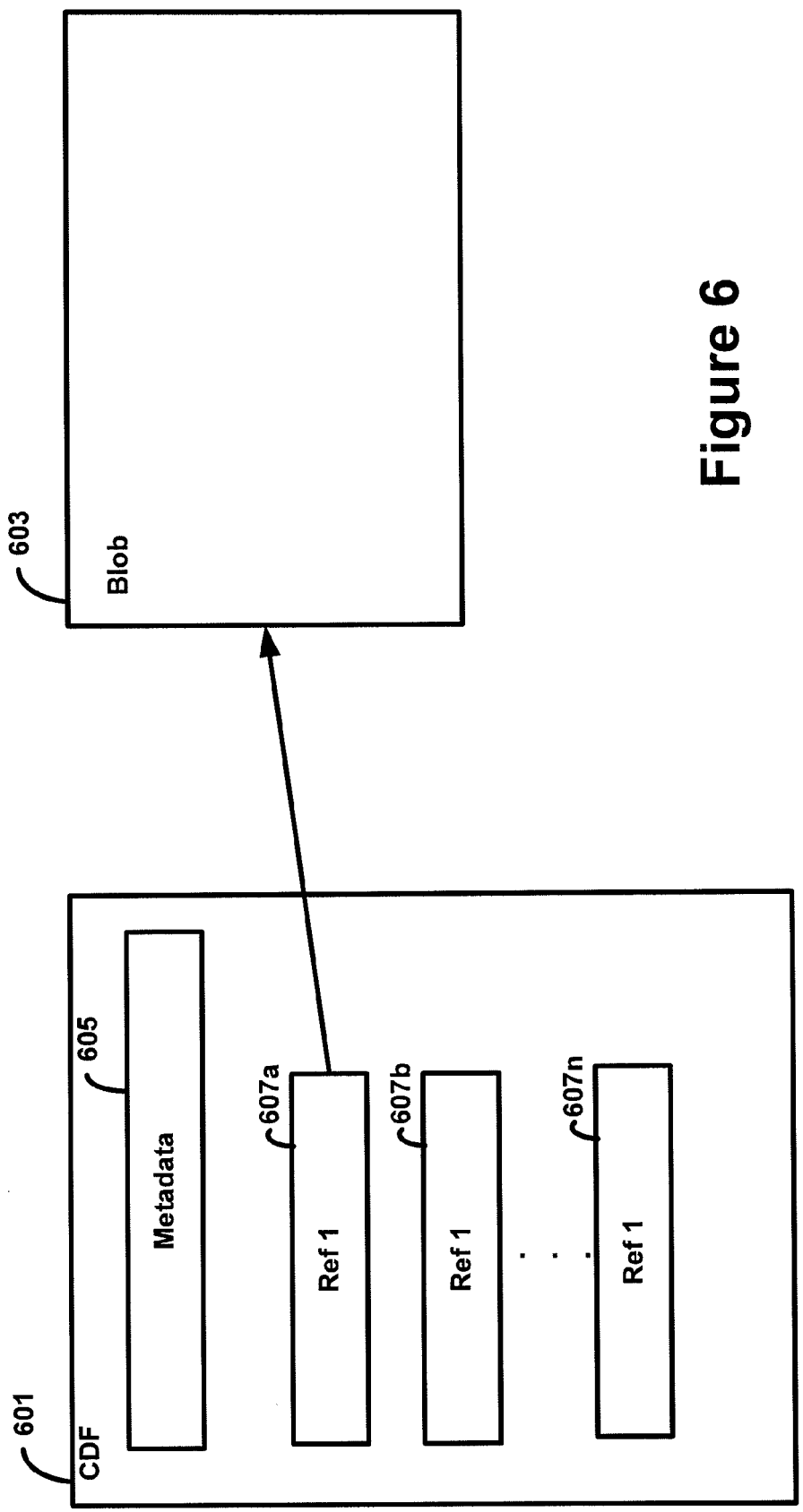
FIG. 6 is a block diagram of blob/content descriptor file (CDF) architecture that may be used in some embodiments.

In some embodiments, OAS system 109 may store two different types of content units: blobs and CDFs. As shown in FIG. 6, a blob 603 may be, for example, the binary data to be stored by a host (e.g., host 101 in FIG. 1), such as, for example, a patient x-ray, company financial records, or any other type of data. When the blob 603 is stored on the OAS system, a unique object identifier is assigned to the blob 603.

Each blob 603 has at least one content descriptor file (CDF) associated with it. CDF 601 may include metadata 605 and a plurality of references 607a, 607b, . . . , 607n. A CDF may reference one or more blobs or CDFs. Thus, the references 607 may be, for example, references to the blobs and/or CDFs referenced by CDF 601. Metadata 605 may include information about the content of blob 603 and/or CDF 601. For example, metadata 605 may include the creation date of CDF 601 (e.g., the date that CDF 601 was stored on the storage system) and a description of the content of blob 603. The description of the blob 603 included in metadata 605 may include information describing the content of blob 603. For example, if blob 603 is an x-ray, metadata 605 may include information such as the patient's name, the date the x-ray was taken, additional doctor's notes regarding the x-ray or patient, or other information. It should be appreciated that the types of metadata given above are only examples of the types of metadata that may be included in metadata 605 of CDF 601. Indeed, any data related to blob 603 may be included in metadata 605, as the present invention is not limited in this respect.

As discussed above, CDF 601 may also include one or more references 607. These references may be, for example, references to blobs or other CDFs. For example, reference 607a may include the object identifier or file system location of blob 603, so that CDF 601 "points to" blob 603 through reference 607a. Hence, blob 603 may be accessed by a host using the object identifier or file system location of CDF 601, because reading the contents of CDF 601 provides the object identifier or file system location for blob 603. In the embodiment shown, CDF 601 also includes a reference 607b that "points to" itself, i.e., reference 607b includes the object identifier or file system location of CDF 601. This reference may be provided to facilitate a garbage collection process that is discussed in section G below. However, the present invention is not limited to the use of that garbage collection process, or to the use of a reference in each CDF that points to itself, as other implementations are possible, and a garbage collection process may be used that does not rely on such a reference.

CDF 601 may include a plurality of other references that point to other CDFs or blobs, so that those CDFs or blobs may also be accessible using the object identifier of CDF 601. In the example of FIG. 6, only one CDF (i.e., CDF 601) is shown "pointing to" blob 603. However, it should be appreciated that multiple CDFs may include references to the same blob. That is, two or more CDFs may "point to" the same blob.

In some embodiments, only blobs are spun down, while CDFs remain on active storage devices. That is, the inventors have appreciated that there are many types of operations that may be performed by accessing the CDF for a blob without accessing the blob itself. Moreover, the inventors have appreciated that a typical blob is generally larger than its corresponding CDF, as blobs may be used to store large amounts of user data, while their corresponding CDFs typically store a relatively small amount of metadata about that user data. Thus, the inventors have recognized that by having only blobs eligible to be spun down while keeping CDFs stored on active storage devices, most of the data stored in content units is eligible to be spun down, but the OAS system is still able to perform many types of operations without having to spin up storage devices that store blobs. Thus, a power savings may be achieved by spinning down blobs, while still retaining the ability to, without having to spin up storage devices, respond to certain types of access requests that do not require accessing the spun down blobs.

For example, because the size of a blob may be determined from metadata stored in its corresponding CDF, the OAS system can respond to a request to determine how much storage space a particular blob is occupying or how much storage space all of the content units stored by a particular user or group are occupying. Because a CDF may also indicate a time of storage of the blobs that it references, the OAS system may also respond to requests, sometimes referred to as query requests, to return the identifiers of all content units stored on the OAS system during a specified time range. These operations are merely examples of types of operations that the OAS system may perform by accessing only a CDF without accessing the blobs referenced by the CDF. Many other types of operations are possible.

Any one of a number of different techniques may be used for spinning down blobs while keeping CDFs stored on active storage devices, and some examples of such techniques are described below.

Figure 7:
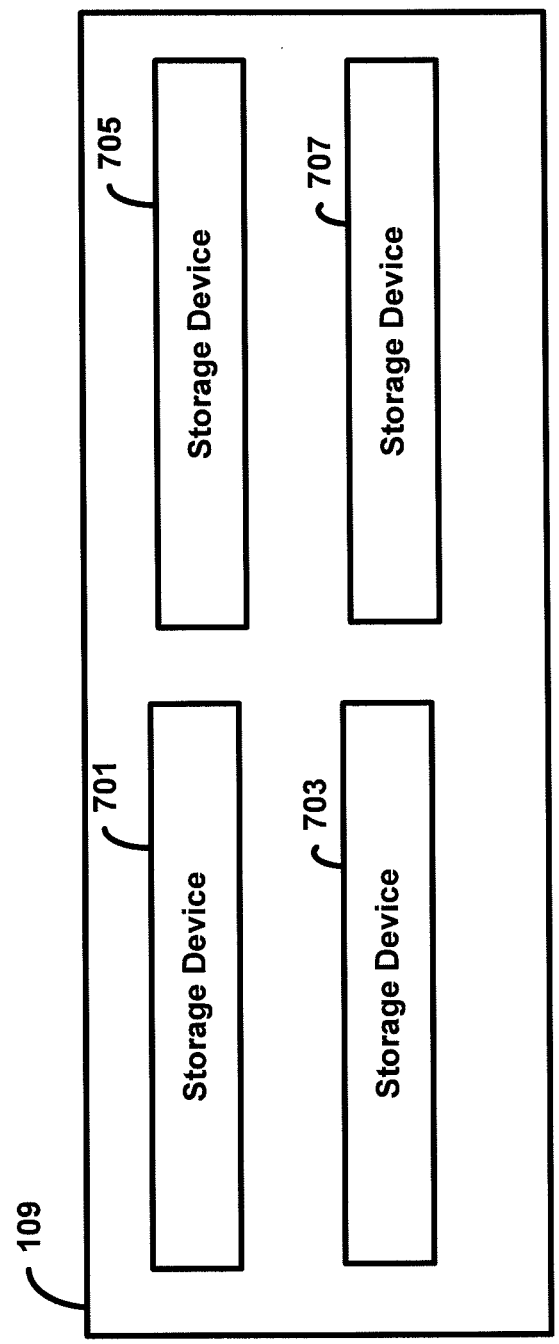
FIG. 7 is a block diagram of an OAS system having a plurality of storage devices, some of which are eligible for spin down and some of which are ineligible for spin down, in accordance with some embodiments.

In some embodiments, when an OAS system receives a request to store a blob and its corresponding CDF(s), the OAS system may store the blob on a storage device (e.g., a disk drive) that is eligible to be spun down, any may store the CDF(s) on a storage device that is not eligible to be spun down. Using this technique, blobs are stored on separate storage devices from CDFs. For example, as shown in FIG. 7, OAS system 109 may include four storage devices (e.g. disk drives) 701, 703, 705, and 707. Storage device 701 may be designated as a storage device for storing CDFs, and is not eligible to be spun down, while storage devices 703, 705, and 707 may be designated as storage devices for storing blobs, and may be eligible to be spun down. When OAS system 109 receives a request (e.g., from host computer 101) to store a blob and its corresponding CDF(s), OAS system 109 may store the CDF(s) on storage device 701 and may store the blob on one of storage devices 703, 705, or 709.

Any one of a number of different techniques may be used to determine when to spin down a storage device that is eligible to be spun down. For example, in some embodiments, the OAS system may implement a storage policy that is configurable by a user or administrator of the OAS system and that specifies when eligible storage devices are to be spun down. For example, the policy may specify that after all of the blobs stored on a spin-down eligible storage device have been stored on the OAS system for at least a month, the storage device may be spun down.

In the examples above, OAS system 109 has four storage devices, three of which are designated to store blobs and are eligible for spin down and one of which stores CDFs and is not eligible for spin down. However, it should be appreciated that this is merely an example, as OAS system 109 may have any suitable number of storage devices, of which any suitable percentage may be designated to store CDFs and any suitable percentage may be designated store blobs.

Additionally, in the examples above, all blobs are considered eligible for spin down. However, in some embodiments, rather than designating all blobs as being eligible for spin down, the configurable storage policy may designate only certain blobs as being eligible for spin down. Thus, for example, the storage policy may specify that only blobs that are larger than a certain threshold (e.g., two megabytes) are eligible for spin down. In such embodiments, when an OAS system receives a request to store a blob and its corresponding CDF, the OAS system may store the CDF on a storage device that is not eligible to be spun down and may apply the storage policy to determine whether the blob is a blob that is eligible to be spun down. When the OAS system determines that the blob is eligible to be spun down, it may be stored on a storage device that is eligible for spin down, whereas when the OAS system determines that the blob is not eligible to be spun down, it may be stored on a storage device that is not eligible for spin down.

Moreover, in the examples above, certain storage devices are designated for storing blobs that are eligible for spin down and certain storage devices are designated for storing CDFs and/or blobs that are not eligible for spin down. In these examples, the storage device on the OAS system on which a content unit is stored is selected at the initial time of storage based on whether the content unit is eligible for spin down. However, the invention is not limited in this respect as, in some embodiments, the initial storage location of a content unit that is selected at the initial time of storage may not be selected based on whether the content unit is eligible for spin down. Rather, the initial storage location may be selected based on one or more other criteria, and content units that are to be spun-down may be subsequently migrated from their initial storage locations to a storage device that is to be spun down. In some embodiments, the configurable storage policy may be used to identify content units that are eligible for spin down (and are to be migrated to a storage device for spin down), determine when the eligible content units are to be migrated, and/or determine when the storage device to which the content units are to be migrated is to be spun down. For example, the storage policy may be configured to specify that once a month blobs that have been stored on the OAS system for at least thirty days and are larger than two MB are to be migrated to a particular storage device for spin down and that once the available storage capacity on this storage device falls below a certain threshold (e.g., five percent) the storage device is to be spun down. Of course, this is but one example of a spin down policy that may be used, and there are numerous other policies that may be used to specify when content units are to be spun down based on many other possible criteria.

C. Spin Down Of Mirror Copies

In some embodiments, OAS system 109 may store a mirror copy of all or some of the content units stored thereon. A mirror copy of a content unit is a copy of the content unit that is stored on a different storage device or storage node of an OAS system that serves as a back-up copy from which the content unit may be restored in case it becomes corrupted or lost (e.g., due to hardware failure). In some embodiments, there may one mirror copy of each content unit that is mirrored (i.e., for a total of two copies of each content unit). However, the invention is not limited in this respect, as any suitable number of mirror copies may be stored.

The inventors have appreciated that a power savings may be achieved by designating certain storage devices or nodes for storing mirror copies of content units. In this manner, one copy of the content unit is stored on a storage device or node that remains active, while a mirror copy of the content unit is stored on a storage device or node that may be spun down. As such, one copy of the content unit is available to be accessed in response to a read request without having to wait to spin up a storage device or node to access the content unit, while a power savings is achieved by storing the mirror copy of the content unit on a spun down storage device or node.

Figure 8:
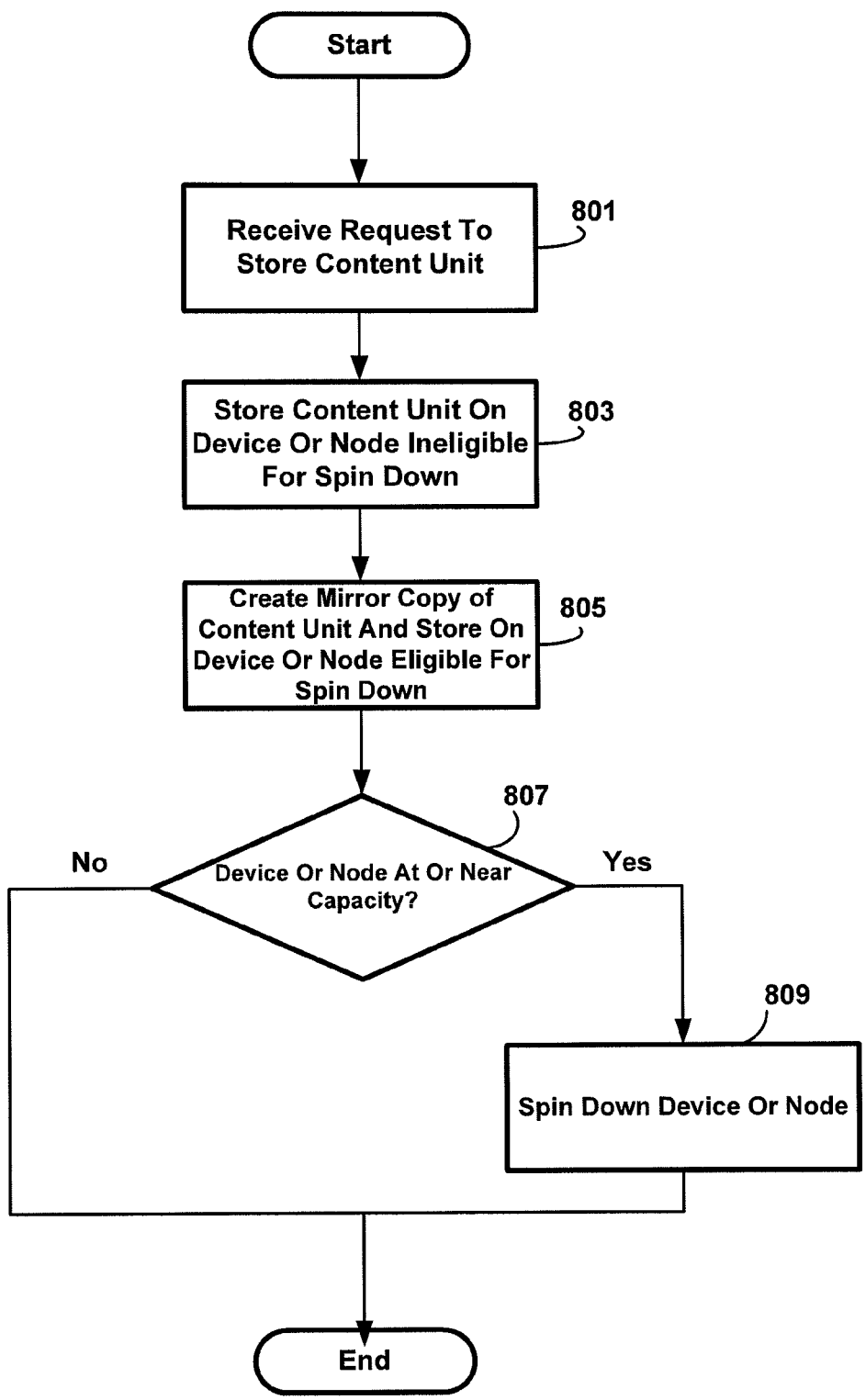
FIG. 8 is a flow chart of an illustrative process for spin down of mirrored content units, in accordance with some embodiments.

Any number of a variety of techniques may be used to store mirror copies of content units on spun down storage devices or nodes. FIG. 8 is a flow chart of one example of a process that may be used to store mirror copies of content units on spun down storage devices or nodes, while keeping a copy of these content units on active storage devices or nodes. The process begins at act 801, where the OAS system receives a request to store a content unit. The process next continues to act 803, where the content unit is stored on a storage device or node that is not eligible to be spun down. The process then continues to act 805, where a mirror copy of a content unit is created and is stored on a storage device or node that is eligible for spin down. The process next continues to act 807, where it is determined if the storage device or node on which the mirror copy of the content unit was stored in act 805 is at or near capacity. For example, in some embodiments, OAS system 109 may determine that the OAS system is at capacity by determining that there is insufficient storage capacity to store any additional content units on this storage device or node, or may determine that the storage device is near capacity by determining that the available storage capacity on the node has fallen below a predefined threshold. If it is determined that the storage device or node is at or near capacity, the process continues to act 809, where the storage device or node is spun down, and the process ends. If, at act 807, it is determined that the storage device or node is not at or near capacity, the process ends.

If it is determined that the active copy of a content unit has become corrupted or is unavailable because of a hardware failure in the device or node on which it is stored, the storage device or node on which the mirror copy is stored may be spun up, and the content unit may be restored from the mirror copy.

It should be appreciated that FIG. 8 is one non-limiting illustrative process of a technique for storing one copy of a content unit on a spun down device or node, while keeping another copy of the content unit active. Any of a number of other techniques may be used, as the invention is not limited in this respect.

D. Traffic-Based Spin Down

As discussed above in connection with FIG. 2, in some embodiments, OAS system 109 may be a distributed storage system having a plurality of independent nodes that communicate with each other such that they appear as a single entity. The inventors have appreciated that in some situations, the content units on some storage nodes in the OAS system may be accessed less frequently than the content units stored on other storage nodes. As a result, some storage nodes may be accessed less frequently than others. The inventors have recognized that more-recently stored content units tend to be accessed with greater frequency than less-recently stored content units. Thus, storage nodes that store older content units may be accessed less frequently. For example, as discussed above, as the storage nodes of OAS system 109 fill up, additional storage nodes may be added to OAS system 109 to increase the storage capacity of the OAS system. The inventors have appreciated that, when new storage nodes are added, these storage nodes are more likely to be accessed than the content units on the other storage nodes.

The inventors have appreciated that a power savings may be achieved by spinning down storage nodes that are accessed infrequently. Any number of techniques may be employed to spin down storage nodes that are infrequently accessed, and the invention is not limited to an particular technique. For example, in some embodiments, the frequency with which content units are accessed on each node may be tracked, and this information may be used to determine which node or nodes to spin down. The frequency with which content units on a particular storage node are accessed may be tracked in any of a number of ways. In one example, each node (or some of the nodes) in OAS system 109 may periodically issue heartbeat messages to the other nodes in the OAS system that indicate that the issuing node is functioning properly and that indicate the processing load on the node. This information may be used to determine whether the node is processing a large number of access requests. When the processing load of a storage node drops below a threshold for a predefined period of time, the storage node may be spun down.

When one or more of the storage nodes of the OAS system are in a spun down state, an access request to store additional content units on the OAS system may be processed by one of the active storage nodes. In some embodiments, it may be desired to determine which storage node is to process an access request to store a content unit based on the processing loads of the storage nodes in the system, such that one of the storage nodes that is more frequently accessed is selected to process the request to store the content unit. That is, because content units that are recently stored are more likely to be accessed frequently, it is desirable to store such a content unit on a storage node that is less likely to be spun down.

If an access request to access a content unit that is stored on a spun down storage node is received, the storage node that stores the content unit may be spun up in order to retrieve the requested content unit and return it in response to the request.

E. File System Based Spin Down

As discussed above in connection with FIGS. 3 and 4, in some embodiments, OAS system 109 may store content units in files in a file system. In some embodiments, the file system may have the above-discussed time-based directory structure, such that the file system location at which a content unit is stored corresponds to its time of storage. The inventors have appreciated that a time based directory structure facilitates spinning down storage devices that store older content units. As discussed above, because older content units are less likely to be accessed, a power savings may be achieved by spinning down the storage devices that store such content units because it is less likely that these storage devices will have to be spun up to respond to read requests for these content units.

Figure 9:
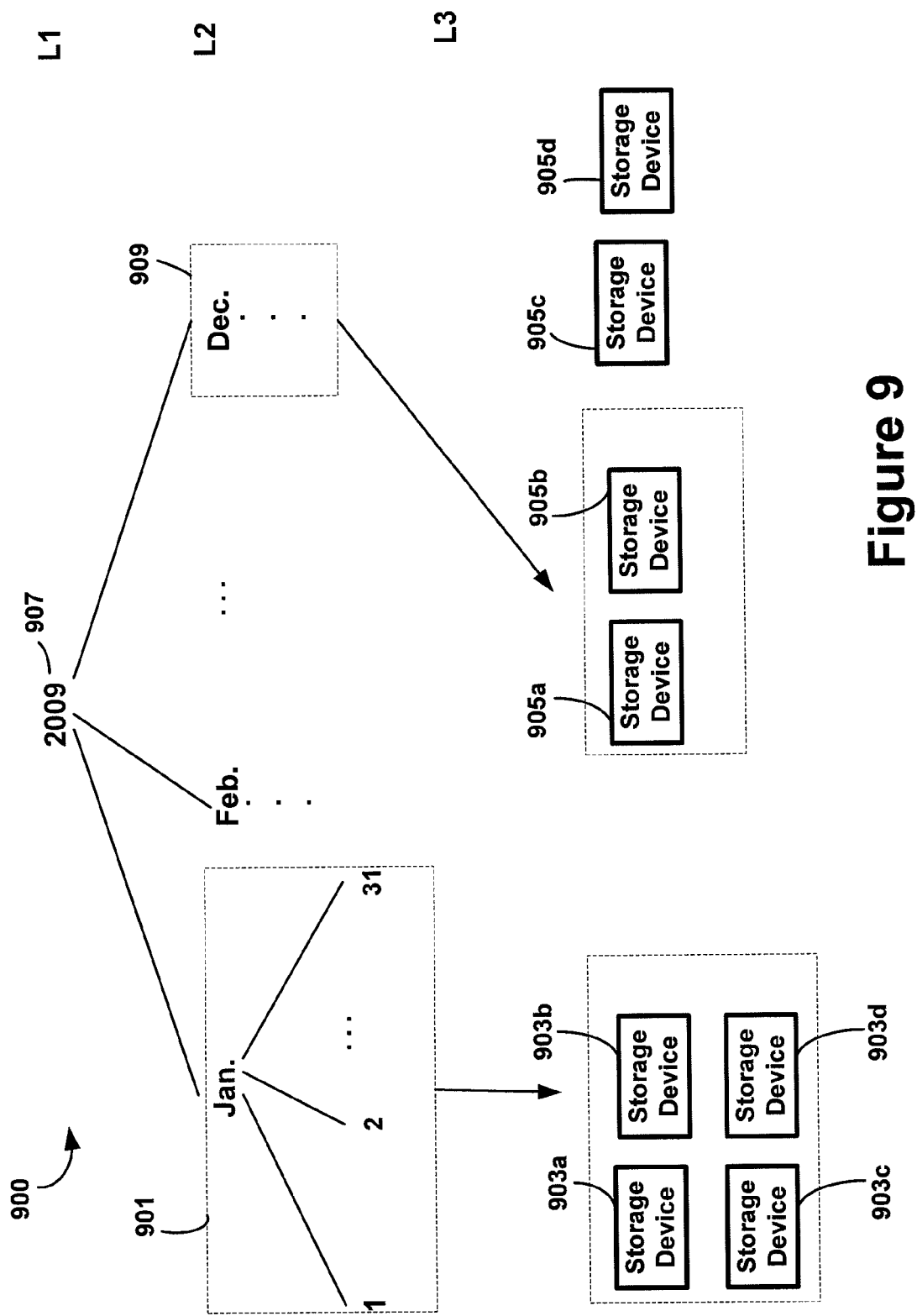
FIG. 9 is a diagram of a file system having portions that may be spun down, in accordance with some embodiments.

Any of a number of techniques may be used to spin down content units stored in a time-based directory structure. In one example, shown in FIG. 9, a time-based directory structure 900 may have three levels of directories, with the directories at L1 corresponding to the year in which the content unit was stored, the directories at L2 corresponding to the month in which the content unit was stored, and the directories at L3 corresponding to the day in which the content unit was stored. Different portions of the directory structure may be mapped to different storage devices, such that the content units logically stored in one portion of the directory structure are physically stored on a particular set of storage devices. For example, in FIG. 9, portion 901 of directory structure 900 comprises the directory for the month "January" and a subdirectory for each day in January. Portion 901 of the file system may be mapped to storage devices 903a, 903b, 903c, and 903d, such that each of the content units logically stored in this portion of the directory structure (i.e., each of the content units stored in January of 2009) is stored on one of storage devices 903a . . . 903d. This may be accomplished, for example, by having each portion of the file system be a separate file system with a particular set of storage devices allocated exclusively for its use, and mounting each portion of the file system into file system 900. For example, portion 901 of file system 900 may be a separate file system that is mounted into file system 900 at directory 907, and portion 909 of file system 900 may also be a separate file system that is mounted into file system 900 at directory 907.

As discussed above, each of these file system portions that is mounted into file system 900 may have a set of storage devices that is allocated exclusively to it. For example, as discussed above, storage devices 903a . . . 903d may be allocated to file system portion 901. As another example, storage devices 905a and 905b may be allocated to file system portion 909.

Thus, content units stored in a particular portion of file system 900 may be spun down by unmounting that portion of the file system from file system 900 and spinning down the storage devices allocated to that portion of the file system. For example, to spin down the content units stored in file system portion 901, file system portion 901 may be unmounted from file system 900, and storage devices 903a . . . 903d may be spun down. If an access requests is subsequently received for a content unit that was logically stored in file system portion 901, storage devices 903a . . . 903d may be spun up and file system portion 901 may be remounted so that the requested content unit may be retrieved and returned in response to the request.

The determination to spin down the content units stored in a portion of a file system having a time-based directory structure may be made in any of numerous possible ways. For example, in some embodiments, the OAS system may apply a storage policy configurable by a user or system administrator that indicates when certain portions of the file system are to be spun down. For example, the storage policy may specify that after thirty days have elapsed since the expiration of the time period covered by the file system portion, the content units in that file system portion may be spun down. Thus, if such a storage policy were employed in the example of FIG.

9, because the file system portion 901 covers the period from Jan. 1, 2009 through Jan. 31, 2009, the content units in file system portion 901 may be spun down thirty days after Jan. 31, 2009. Similarly, the content units in file system portion 909 may be spun down thirty days after Dec. 31, 2009. Of course, this is but one example of a storage policy that may be used, as any number of different storage policies are possible.

F. Federations

The inventors have appreciated that, in some situations, an OAS system that is part of a federation of OAS systems may be spun down to achieve a power savings. Federations of OAS systems are discussed in greater detail in U.S. patent application Ser. No. 10/787,337 (published as U.S. Patent Publication No. 2005/0193084), which is hereby incorporated by reference in its entirety.

Figure 10:
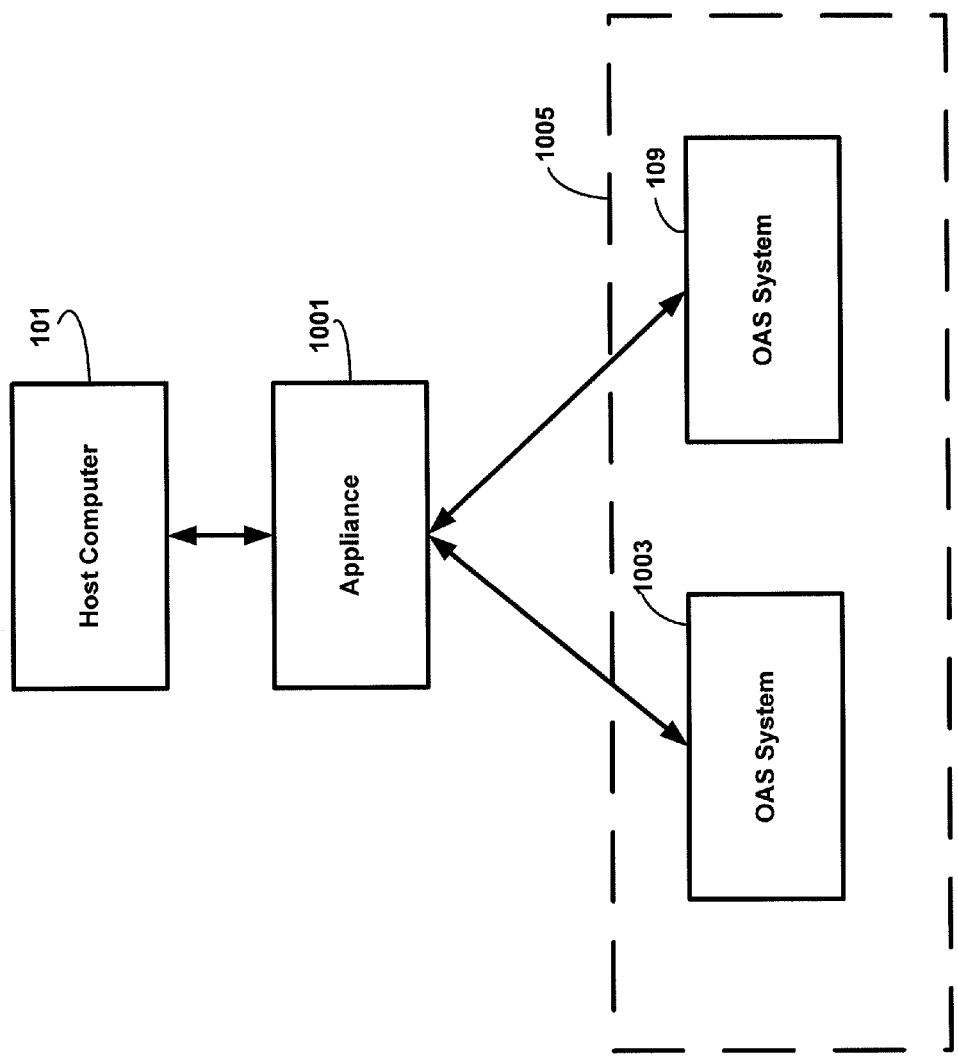
FIG. 10 is a block diagram of a computer system having a federation of OAS systems.

A federation of OAS systems is two or more OAS systems that appear to accessing entities as a single OAS system. For example, FIG. 10 shows a federation 1005 comprising OAS system 1003 and OAS system 109. From the perspective of host computer 101, federation 1005 may appear as a single OAS system. For example, host computer 101 may send, to appliance 1001, access requests to store content on and retrieve content from OAS system 1003 or OAS system 109. The user(s) or application program(s) that issue such requests are unaware that federation 1005 comprises multiple OAS systems and, as such, do not designate any particular one of the OAS systems in federation 1005 to service such access requests.

When appliance 1001 receives an access request from host computer 101, it determines which OAS system is to service the request, and sends the access request to the selected OAS system. For example, if appliance 1001 receives a request from a host computer 101 to store a content unit, it may select one of OAS systems 1003 and 109 to store the content unit and forward the access request to the OAS system. If appliance 1001 receives an access request to retrieve a previously stored content unit, it may determine which OAS system in federation 1005 stores the content unit and forward the access request to the OAS system that stores the content unit.

In some embodiments, each OAS system in a federation may be a distributed storage system comprising a plurality of independent nodes. In such embodiments, each OAS system in the federation may be considered to be a separate storage cluster. As used herein, the term storage cluster refers to a group of one or more interconnected nodes that share at least one software utility that logically connects them.

In some embodiments, appliance 1001 may monitor access requests destined for the OAS systems in federation 1005. If access requests destined for one of the OAS systems (i.e., requests to read, delete, or otherwise access content units stored on the one of the OAS systems) in the federation are infrequent, appliance 1001 may spin-down the entire OAS system (i.e., by issuing a command to power down the entire OAS system or issuing one or more commands to spin down each of the storage devices in the OAS system). If an access request for a content unit stored on the spun-down OAS system is received, appliance 1001 may spin-up this OAS system so that the OAS system may respond to the access request.

In some embodiments, a computer system may initially comprise only a single OAS system (e.g., as shown in FIG. 1). As the storage capacity on the OAS system begins to fill up, an additional OAS system may be added to create a federation of OAS systems. For example, initially a computer system may comprise only OAS system 109. As the storage capacity on OAS system 109 begins to fill up, OAS system 1003 may be added to the computer system to form federation 1005. In some embodiments, when the computer system comprises only a single OAS system, entities sending access requests to the OAS system (e.g., host computer 101) need not send the access requests to the OAS system through an appliance, such as appliance 1001. Thus, when the computer system comprises a single OAS system, the computer system need not include an appliance 1001, though in some embodiments, the computer system may include an appliance 1001 through which accessing entities send access requests (even when the computer system includes only a single OAS system). Thus, in embodiments in which the computer system does not initially include an appliance 1001, appliance 1001 may be added to the computer system when a second OAS system is added to form the federation.

In some embodiments, when an additional OAS system is added to a federation, any subsequent requests to store content units that are received by appliance 1001 may be directed to the newly added federation, and appliance 1001 may store the time at which the newly added OAS system is added to the federation. For example, in FIG. 10, if the computer system initially comprises only OAS system 109, but on Jun. 30, 2008 at 5:32 a.m. OAS system 1003 and appliance 1001 are added to the computer system, appliance 1001 may store Jun. 30, 2008 at 5:32 a.m. as the time at which OAS system 1003 was added to federation 1005. In addition, any access requests that appliance 1001 receives to store content units in federation 1005 may be directed to OAS system 1003.

Because content units stored in federation 1005 after the addition of OAS system 1003 are stored on OAS system 1003, appliance 1001 may use the information indicating the time at which OAS system 1003 was added to the computer system to determine, in response to an access request to access a content unit stored in federation 1005, on which OAS system in federation 1005 the requested content unit is stored.

For example, if, as discussed above, the computer system initially comprises OAS 109 and OAS system 1003 is added to the computer system on Jun. 30, 2008 at 5:32 a.m, appliance 1001 may determine that any content unit stored in federation 1005 before Jun. 30, 2008 at 5:32 a.m is stored on OAS system 109, while any content unit stored in federation 1005 on or after Jun. 30, 2008 at 5:32 a.m is stored on OAS system 1003. Thus, when appliance 1001 receives an access request (e.g., a read, delete, query, or other type of access request) to access a content unit stored in federation 1005, appliance 1001 may determine the time of storage of the requested content unit, and use this information to determine whether the requested content unit is stored on OAS system 109 or OAS system 1003.

Appliance 1001 may determine the time of a storage of a requested content unit in any of a variety ways, any of which may be used in various embodiments of the present invention. In some embodiments, the object identifier for a content unit may include, in a portion of the object identifier, a timestamp indicating the time of storage of the content unit. For example, when a content unit is stored on an OAS system and an object identifier for the content unit is generated, a timestamp indicative of the time of storage of the content unit may be included in the object identifier. Thus, when appliance 1001 receives an access request (e.g., from host computer 101) to access a content unit stored in federation 1005 that identifies the requested content unit using its object identifier, appliance 1001 may analyze the timestamp portion of the object identifier to determine the time at which the content unit was stored, and use this information to determine on which OAS system in federation 1005 the requested content unit is stored.

In some embodiments, appliance 1001 may use the information indicating the time at which a content unit was stored to determine whether the requested content unit is stored on a spun down storage system. That is, as discussed above, appliance 1001 may determine that, in some situations, a power savings may be achieved by spinning down one of the OAS systems in federation 1005, and may cause this OAS system to be spun down. Appliance 1001 may track which OAS systems in federation 1005 are spun up and which are spun down. Thus, when appliance 1001 determines on which OAS system a requested content unit is stored, the appliance may also determine whether the OAS system on which the requested content unit is stored is spun up or spun down. When the requested content unit is stored on a spun down OAS system, appliance 1001 may cause the spun down OAS system to be spun up, forward the access request for the content unit to OAS system, and once the OAS system has serviced the access request, cause the OAS system to be spun down.

As discussed above, the inventors have appreciated that content units accessed more recently are more likely to be accessed in the future. Thus, in some embodiments, when an access request to retrieve a content unit on a spun-down OAS system is received, the OAS system may be spun up to respond to the access request, and the content unit may be moved to another OAS system in the federation before the OAS system is spun down again, such that the OAS system need not be spun up if a future access request for that same content unit is subsequently received.

Similarly, when a spun down OAS system is spun up to respond to an access request, one or more content units stored on another OAS system in the federation that have not been recently accessed may be copied to the OAS system that has been spun up in response to the access request, such that these not-recently accessed content units may be spun down when the OAS system is spun back down. In this manner, storage space on the active OAS system(s) on which such content units were previously stored may be freed up to store more recently accessed content units.

Some of the examples above relate to techniques for determining on which OAS system, in a federation of two OAS systems, a requested content unit is stored, based on the time of storage of the content unit. It should be appreciated that these same techniques may be used in a federation that comprises three, four, or more OAS systems. For example, in FIG. 10, if OAS system 1003 were added to the computer system at Jun. 30, 2008 at 5:32 a.m, and a third OAS system (not shown) were added to federation 1005 at Jun. 30, 2009 at 7:32 a.m, appliance 1001 may store both the time at which OAS system 1003 was added and the time at which the third OAS system was added. Thus, appliance 1001 may determine that content units stored before Jun. 30, 2008 at 5:32 a.m. are stored on OAS system 109, content units stored on or after Jun. 30, 2008 at 5:32 a.m. but before Jun. 30, 2009 at 7:32 a.m. are stored on OAS system 1003, and content units stored on or after Jun. 30, 2009 at 7:32 a.m. are stored on the third OAS system.

The inventors have appreciated that, when an OAS system in a federation that is spun down is frequently needed to service access requests, spinning up the OAS system in response to each such access request and spinning down the OAS system after the access request is serviced may reduce or eliminate any power savings that is achieved during the time in which the OAS system is spun down. Thus, in some embodiments, appliance 1001 may queue access requests that need to be service by a spun down system and periodically spin up the OAS system to process the queued access requests in a batch.

For example, in FIG. 10, if OAS system 109 is spun down and appliance 1001 receives an access request for a content unit that is stored on OAS system 109, rather than spinning up OAS system 109 to service the access request, appliance 1001 may store the access request in a queue (or other data structure) that stores other access requests to be serviced by OAS system 109, but that were received by appliance 1001 while OAS system 109 is spun down. Appliance 1001 may periodically cause OAS system 109 to be spun up to service the access requests in the queue. The frequency with which OAS system 109 is spun up to service access requests in the queue may be determined in any suitable way. For example, in some embodiments, OAS system 109 may be spun up according to a predefined schedule. As an example, OAS system 109 may be spun up once per day to service access requests received over the past day. In some embodiments, OAS system 109 may be spun up when the number of access requests in the queue reaches or exceeds a pre-defined threshold. For example, when the number of access requests in the queue exceeds fifty, OAS system 109 may be spun up to service the access requests in the queue. In some embodiments, once OAS system 109 has serviced the access requests in the queue, OAS system 109 may be spun down again.

In the examples discussed above, an OAS system in a federation is spun down based on the frequency with which content units stored in the OAS system are accessed. However, the invention is not limited in this respect, as the determination may be made to spin down an OAS system in a federation based on any other suitable criterion or criteria. For example, in some embodiments, an OAS system may be spun down according to a static, but configurable schedule. Any suitable schedule may be used. For example, the schedule may specify that an OAS system is to be spun down on Saturdays and Sundays, or the schedule may specify that the OAS system is to be spun down every day between the hours of 10 p.m. and 5 a.m. In some embodiments, the time at which an OAS system is spun down may be based on a time at which a new OAS system is added to the computer system. For example, in the embodiments discussed above, in which the computer system initially comprises only OAS system 109, and OAS system 1003 is added at a later time, OAS system 109 may be spun down after a specified amount of time has elapsed since OAS system 1003 was added to the computer system.

In addition, the inventors have appreciated that in some situations, the OAS systems in a federation may primarily be used to service write requests (i.e., to store content units), but may very infrequently receive requests to access stored previously-stored content units. This may occur, for example, if the OAS systems are used to archive documents or other content that is desired to be retained, but is not frequently accessed. For example, a company may wish to archive all of its financial records, but may only need to access this archived data if a problem that pertains to this data is discovered in the future. In such a situation, the OAS systems in the federation would process many requests to store data, but would process very few requests to access previously-stored data.

In such situations, the inventors have appreciated that a power savings may be achieved by keeping one or more OAS systems at a time active (i.e., spun up) to process write requests, and keeping the other OAS systems in the federation spun down. The OAS system(s) that are active may be alternated so that stored content units are distributed across all of the OAS systems in the federation. For example, in a federation comprising three OAS systems, a first OAS system may initially be active, while the second and third OAS systems are spun down. After the first OAS system has been active for a certain amount of time, the first OAS system may be spun down, and the second OAS system may be spun up. When the second OAS system has been active for a certain amount of time, the second OAS system may be spun down, and the third OAS system may be spun up. This process may continue, such that the OAS systems are spun up and spun down in a round-robin fashion.

In some embodiments, when appliance 1001 determines that an OAS system in a federation is to be spun down, appliance 1001 may perform some migration of content units in an attempt to reduce the frequency with which the OAS system is spun up to service access requests. For example, appliance 1001 may identify content units on the OAS system that are accessed frequently and/or have been accessed recently, and may migrate these content units to another OAS system in the federation prior to spinning down the OAS system.

A similar technique may be used in a computer system that comprises a single OAS system, where the OAS system processes write requests frequently, but infrequently receives read requests. For example, the OAS system may keep a subset of its storage devices spun up to process write requests while keeping the remainder of the storage devices spun down, and may alternate which subset of storage devices are spun up (e.g., in a round robin fashion or using some other technique).

G. Maintenance Spin Up

The inventors have appreciated that it may be desirable to spin up a spun down storage device, node, or OAS system, not in response to an access request for any content unit stored thereon, but rather to perform certain maintenance operations on the content units stored thereon.

For example, in an OAS system it may be desirable to periodically perform system maintenance operations such as garbage collection, content unit scrubbing, content unit regeneration, and/or other maintenance operation(s). Garbage collection involves identifying content units stored on an OAS system that are eligible to be deleted. For example, in some embodiments, content units that are unreferenced by any CDF may be eligible to be deleted by the garbage collection process. Scrubbing may be performed in OAS systems that are CAS systems. Scrubbing of a content unit involves re-computing the content address for the content unit and comparing the re-computed content address to the previously-computed content address for the content unit. Because the content address for a content unit is generated based, at least in part, on at least a portion of the content of the content unit, if the content addresses do not match, it may be determined that the content of the content unit has been altered or become corrupted, and the content unit may need to be regenerated from a mirror copy. Regeneration involves repairing or replacing a content unit that has become corrupted or lost (e.g., due to hardware failure) using another copy of the content unit.

In some embodiments, spun down storage devices, nodes, or OAS systems may be spun up in order to perform such maintenance operations. Such maintenance operations may be performed with any suitable frequency. For example, a the OAS system may implement a policy configurable by a user or system administrator that specifies the frequency with which the maintenance operations are to be performed, and may specify a different frequencies for storage devices, storage nodes, or OAS systems that are spun down and storage devices, storage nodes, or OAS systems that are active.

III. Additional Information

The above-described embodiments of the present invention can be implemented in any of numerous ways. For example, the embodiments may be implemented using hardware, software or a combination thereof. When implemented in software, the software code can be executed on any suitable hardware processor or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An object addressable storage (OAS) system comprising:
 a plurality of storage devices, each of which stores a plurality of content units;
 at least one input/output (I/O) interface configured to receive access requests to access the OAS system, wherein an access request to access a content unit stored on one of the plurality of storage devices identifies the requested content unit using an object identifier that, from the perspective of an entity issuing the access request, does not indicate any physical or logical storage location of the requested content unit on the OAS system; and
 at least one controller, coupled to at least some of the plurality of storage devices and the at least one I/O interface, configured to:

during operation of the OAS system, selectively spin down at least one of the plurality of storage devices, wherein after spinning down the at least one of the plurality of storage devices, at least one other of the plurality of storage devices remains active and the at least one controller remains available to process access requests received via the at least one I/O interface;

when an access request is a request to store a content unit, select physical storage for the content unit based on which of the plurality of storage devices is eligible to be spun down such that the content unit is stored on a first one of the plurality of storage devices that is not eligible to be spun down and a copy of the content unit is stored on a second one of the plurality of storage devices that is eligible to be spun down.

2. The OAS system of claim 1, wherein the OAS system is segregated into a plurality of virtual pools comprising at least first and second virtual pools, wherein the first virtual pool is associated with a policy that indicates that content units stored in the first virtual pool are available to be stored on a spun down storage device, and wherein the controller is configured to:

receive, via the at least one I/O interface, an access request to store a content unit;

in response to receiving the access request, determine whether the content unit is to be stored in the first virtual pool; and in response to determining that the content unit is to be stored in the first virtual pool, storing the content unit on one of the plurality of storage devices that is eligible to be spun down.

3. The OAS system of claim 1, wherein the OAS system is segregated into a plurality of virtual pools comprising at least first and second virtual pools, wherein the first virtual pool is associated with a policy that indicates that content units stored in the first virtual pool are available to be stored on a powered down storage device, and wherein the controller is configured to:

identify at least some of the plurality of content units stored on the OAS system that are stored in the first virtual pool;

move the identified content units to at least one of the plurality of storage devices that is eligible to be spun down; and wherein selectively spinning down at least one of the plurality of storage devices is done in response to moving the identified content units.

4. The OAS system of claim 1, wherein the plurality of content units stored on the OAS system comprise at least two different types of content units including a blob of data and a content descriptor file (CDF) that corresponds to the blob and forms a blob/CDF set with the blob, the CDF including metadata relating to the corresponding blob, and wherein the at least one controller is configured to:

identify at least some of the plurality of content units stored on the OAS system that are blobs that are eligible to be spun down;

move the identified content units to at least one of the plurality of storage devices that is eligible to be spun down; and wherein selectively spinning down at least one of the plurality of storage devices is done in response to moving the identified content units.

5. The OAS system of claim 1, wherein the plurality of content units stored on the OAS system comprise at least two different types of content units including a blob of data and a content descriptor file (CDF) that corresponds to the blob and forms a blob/CDF set with the blob, the CDF including metadata relating to the corresponding blob, and wherein the at least one controller is configured to:

receive a request to store two content units comprising a received blob and a received CDF;

store the received blob on a first one of the plurality of storage devices that is eligible to be spun down;

store the received CDF on a second one of the plurality of storage devices that is not eligible to be spun down.

6. The OAS system of claim 1, further comprising a plurality of storage nodes, each of which comprises at least one of the plurality of storage devices, wherein the at least controller is configured to:

determine a frequency with which content units stored on a first storage node of the plurality of storage nodes are accessed; and when it is determined that the frequency is below a threshold, spin down the first storage node.

7. The OAS system of claim 1, further comprising a file system having a plurality of directories arranged in a hierarchical structure, wherein the file system comprises a first file system portion that logically stores at least some of the plurality of content units and that maps to at least one of the plurality of storage devices on which the at least some of the plurality of content units are physically stored, and wherein the at least one controller is configured to:

determine that the at least some of the plurality of content units logically stored in the first file system portion are eligible to be spun down;

in response to determining that the at least some of the plurality of content units logically stored in the first file system portion are eligible to be spun down, unmount the first file system portion from the file system; and spin down the at least one of the plurality of storage devices to which the first file system portion maps.

8. The OAS system of claim 1, wherein the at least one of the plurality of storage devices that has been spun down comprises a first storage device of the plurality of storage devices, and wherein the controller is configured to:

receive a request to access a content unit stored on the first storage device;

in response to the request, spin up the first storage device; and access the content unit from the first storage device.

9. The OAS system of claim 1, wherein the at least one of the plurality of storage devices that has been spun down comprises a first storage device of the plurality of storage devices, and wherein the controller is configured to:

spin up the first storage device to perform at least one maintenance operation on at least some of the content units stored on the first storage device; and perform the at least one maintenance operation of the at least some of the content units.

10. A computer in a computer system comprising the computer and a federation of storage systems, wherein the federation of storage systems comprises a first object addressable storage (OAS) system and a second OAS system, and wherein the computer comprises:

at least one tangible memory;

at least one input/output (I/O) interface configured to receive access requests to access the federation and to send access requests to the first OAS system and second OAS system; and at least one controller, coupled to the at least one tangible memory and the at least one I/O interface, configured to:

receive a first access request from a host computer to access a content unit stored in the federation, wherein the first access request identifies the requested content unit using an object identifier that, from the perspective of the host computer, does not indicate any physical or logical storage location of the requested content unit in the federation, and wherein the object identifier includes a timestamp that indicates a time at which the requested content unit was stored in the federation;

in response to the receiving the first access request, determine which OAS system in the federation stores the requested content unit based, at least in part, on the timestamp in the object identifier;

determine whether the OAS system in the federation that stores the requested content unit is in a spun down state;

after it is determined that the OAS system in the federation that stores the requested content unit is in a spun down state, cause the OAS system in the federation that stores the requested content unit to be spun up; and send a second access request to the OAS system in the federation that stores the requested content unit to access the requested content unit, wherein the second access request identifies the requested content unit using its object identifier.

11. The computer of claim 10, wherein the second OAS system was added to the federation at a time after the first OAS system, wherein the computer stores, in the at least one tangible memory, the time which the second OAS system was added to the federation, and wherein the at least one controller is configured to determine which OAS system stores the requested content unit based, at least in part, by comparing the timestamp in the object identifier to the time at which the second OAS system was added to the federation.

12. The computer of claim 11, wherein the at least one controller is configured to determine that the first OAS system stores the requested content unit when the timestamp in the object identifier is before the time at which the second OAS system was added to the federation, and to determine that the second OAS system stores the requested content unit when the timestamp in the object identifier is after the time at which the second OAS system was added to the federation.

13. The computer of claim 10, wherein the computer stores, in the at least one tangible memory first state information indicating whether the first OAS system is spun up or spun down and second state information indicating whether the second OAS system is spun or spun down, and wherein the at least one controller is configured to determine whether the OAS system in the federation that stores the requested content unit is in a spun down state using the first state information and/or the second state information.

14. The computer of claim 10, wherein when it is determined that the first OAS system is the OAS system in the federation that stores the requested content unit and the first OAS system in the federation is spun down, the at least one controller is configured to:

store the second access request in a queue in the at least one tangible memory before causing the first OAS system to be spun up and before sending the second access request to the first OAS system;

after storing the second access request in the queue, receive a third access request to be processed by the first OAS system;

store the third access request in the queue;

after storing the third access request in the queue, cause the first OAS system to be spun up; and after the first OAS system is spun up, send the second and third access requests to the first OAS system.

15. A method of operating an object addressable storage (OAS) system that comprises a plurality of storage devices, each of which stores a plurality of content units, and at least one input/output (I/O) interface configured to receive access requests to access the OAS system, wherein an access requests to access a content unit stored on one of the plurality of storage devices identifies the requested content unit using an object identifier that, from the perspective of an entity issuing the access request, does not indicate any physical or logical storage location of the requested content unit on the OAS system, the method comprising:

during operation of the OAS system, selectively spinning down at least one of the plurality of storage devices, wherein after spinning down the at least one of the plurality of storage devices, at least one other of the plurality of storage devices remains active and the at least one controller remains available to process access requests received via the at least one I/O interface;

when the access request is a request to store the content unit, selecting physical storage for the content unit based on which of the plurality of storage devices are eligible to be spun down such that the content unit is stored on a first one of the plurality of storage devices that is not eligible to be spun down and a copy of the content unit is stored on a second one of the plurality of storage devices that is eligible to be spun down.

16. The method of claim 15, wherein the OAS system is segregated into a plurality of virtual pools comprising at least first and second virtual pools, wherein the first virtual pool is associated with a policy that indicates that content units stored in the first virtual pool are available to be stored on a spun down storage device, and wherein the method further comprises:

receiving, via the at least one I/O interface, an access request to store a content unit;

in response to receiving the access request, determining whether the content unit is to be stored in the first virtual pool; and in response to determining that the content unit is to be stored in the first virtual pool, storing the content unit on one of the plurality of storage devices that is eligible to be spun down.

17. The method of claim 15, wherein the OAS system is segregated into a plurality of virtual pools comprising at least first and second virtual pools, wherein the first virtual pool is associated with a policy that indicates that content units stored in the first virtual pool are available to be stored on a powered down storage device, and wherein the method further comprises:

identifying at least some of the plurality of content units stored on the OAS system that are stored in the first virtual pool;

moving the identified content units to at least one of the plurality of storage devices that is eligible to be spun down; and wherein selectively spinning down at least one of the plurality of storage devices is done in response to moving the identified content units.

18. The method of claim 15, wherein the plurality of content units stored on the OAS system comprise at least two different types of content units including a blob of data and a content descriptor file (CDF) that corresponds to the blob and forms a blob/CDF set with the blob, the CDF including metadata relating to the corresponding blob, and wherein the method further comprises:

receiving a request to store two content units comprising a received blob and a received CDF;

storing the received blob on a first one of the plurality of storage devices that is eligible to be spun down;

storing the received CDF on a second one of the plurality of storage devices that is not eligible to be spun down.

* * * * *